(12) United States Patent
Gandrud et al.

(10) Patent No.: US 12,205,465 B2
(45) Date of Patent: Jan. 21, 2025

(54) INCENTIVE-DRIVEN ROADWAY CONDITION MONITORING FOR IMPROVED SAFETY OF MICROMOBILITY DEVICE OPERATION

(71) Applicant: 3M INNOVATIVE PROPERTIES COMPANY, St. Paul, MN (US)

(72) Inventors: Jonathan D. Gandrud, Woodbury, MN (US); Panagiotis D. Stanitsas, Palo Alto, CA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 415 days.

(21) Appl. No.: 17/610,177

(22) PCT Filed: May 20, 2020

(86) PCT No.: PCT/IB2020/054792
§ 371 (c)(1),
(2) Date: Nov. 10, 2021

(87) PCT Pub. No.: WO2020/240352
PCT Pub. Date: Dec. 3, 2020

(65) Prior Publication Data
US 2022/0215753 A1 Jul. 7, 2022

Related U.S. Application Data

(60) Provisional application No. 62/852,489, filed on May 24, 2019.

(51) Int. Cl.
*G08G 1/0968* (2006.01)
*G07C 5/00* (2006.01)
(Continued)

(52) U.S. Cl.
CPC ....... *G08G 1/096805* (2013.01); *G07C 5/008* (2013.01); *G08G 1/0112* (2013.01); *G08G 1/096741* (2013.01); *G08G 1/096791* (2013.01)

(58) Field of Classification Search
None
See application file for complete search history.

(56) References Cited

U.S. PATENT DOCUMENTS

| 5,775,452 A | 7/1998 | Patmont |
| 7,676,377 B2 | 3/2010 | Hamidpour |

(Continued)

FOREIGN PATENT DOCUMENTS

| WO | WO 2016-056569 | 4/2016 |
| WO | WO 2016-060161 | 4/2016 |

(Continued)

OTHER PUBLICATIONS

Bliss, "Behind the Big Promises of the Micromobility Industry", Citylab [on line], Feb. 2019, (Retrieved from Internet Mar. 25, 2019), URL <https://www.citylab.com/transportation/2019/02/micromobility-conference-electric-scooters-bike-share/581791/>, 7 pages.

(Continued)

*Primary Examiner* — Christian Chace
*Assistant Examiner* — Shayne M. Gilbertson
(74) *Attorney, Agent, or Firm* — Jonathan L. Tolstedt (57) ABSTRACT

A computing device includes one or more computer processors, and a memory including instructions that, when executed by the one or more computer processors, cause the
(Continued)

one or more computer processors to receive roadway condition data from a first electrically powered scooter for a particular portion of a roadway, wherein the roadway condition data indicates a roadway condition for the particular portion of the roadway, generate, based at least in part on the roadway condition for the particular portion of the roadway, data usable by a computing device associated with the second electrically powered scooter to traverse the particular portion of a roadway, and send the data to the computing device associated with the second electrically powered scooter to traverse the particular portion of the roadway.

16 Claims, 5 Drawing Sheets

(51) Int. Cl.
    *G08G 1/01* (2006.01)
    *G08G 1/0967* (2006.01)

(56) References Cited

U.S. PATENT DOCUMENTS

| | | | |
|---|---|---|---|
| 2002/0139591 A1* | 10/2002 | Wisecarver | B62K 5/025 |
| | | | 180/65.1 |
| 2009/0160675 A1 | 6/2009 | Piccinini | |
| 2013/0113618 A1 | 5/2013 | Flanagan | |
| 2015/0356867 A1 | 12/2015 | Bogren | |
| 2016/0104183 A1* | 4/2016 | Moore | G05D 1/0291 |
| | | | 701/23 |
| 2016/0171521 A1* | 6/2016 | Ramirez | G08G 1/096838 |
| | | | 701/409 |
| 2018/0218596 A1 | 8/2018 | Castelli | |
| 2018/0222473 A1 | 8/2018 | Shami | |
| 2018/0345961 A1 | 12/2018 | Saigusa | |
| 2019/0333387 A1* | 10/2019 | Lau | H04W 4/90 |
| 2020/0223443 A1* | 7/2020 | Gonzalez Aguirre | |
| | | | B60W 40/068 |
| 2020/0262438 A1* | 8/2020 | Bai | G08G 1/0112 |
| 2021/0181753 A1* | 6/2021 | Likhterman | G08G 1/012 |
| 2022/0144257 A1* | 5/2022 | Maeda | B60W 60/00274 |

FOREIGN PATENT DOCUMENTS

| | | |
|---|---|---|
| WO | WO 2018-020472 | 2/2018 |
| WO | WO 2020-018394 | 1/2020 |
| WO | WO 2020-082089 | 4/2020 |
| WO | WO 2020-240353 | 12/2020 |

OTHER PUBLICATIONS

Doctorow, "A Guide to the Valuable Electronics Inside Bird's Illegal-In-San Francisco Scooters", Boing Boing (Retrieved from Internet Mar. 25, 2019), URL <https://boingboing.net/2018/05/25/drinkbot-anyone.html>, 6 pages.

"E Series Module Datasheet (V001)", Particle Datasheets [on line], Nov. 2017, (Retrieved from Internet Mar. 25, 2019), URL <https://docs.particle.io/datasheets/cellular/e-series-datasheet/>, 28pages.

Hawkins, "The electric scooter craze is officially one year old—what's next?", The Verge [on line], Sep. 20, 2018 (Retrieved from Internet Mar. 25, 2019), URL <https://www.theverge.com/2018/9/20/17878676/electric-scooter-bird-lime-uber-lyft>, 8 pages.

Holley, "Scooter use is rising in major cities. So are trips to the emergency room", The Washington Post [on line], Sep. 2018, (Retrieved from Internet Mar. 25, 2019), URL <https://www.washingtonpost.com/business/economy/scooter-use-is-rising-in-major-cities-so-are-trips-to-the-emergency-room/2018/09/06/53d6a8d4-abd6-11e8-a8d7-0f63ab8b1370_story.html>, 6 pages.

"M365 Model Repair Guide", BIRD [on line], (date unknown but believed to be prior to the date of the filing of the present application), (Retrieved from Internet Mar. 25, 2019), URL <https://bird.zendesk.com/hc/en-us/articles/360015313392-M365-Model-Repair-Guide>, 34 pages.

Marshall, "Micromobility: The Prose and Poetry of the Scooter-Faithful", Wired [on line], Apr. 2, 2019 (Retrieved from Internet Mar. 25, 2019), URL <https://www.wired.com/story/micromobility-conference-scooters-bikes/>, 8 pages.

Robinson, "A Startup in the West Coast Scooter Sharing Craze is Already Worth $1 Billion—Here's What it's Like to Ride a Bird Scooter", Business Insider [on line], May 2018, (Retrieved from Internet Mar. 25, 2019), URL <https://www.businessinsider.com/bird-electric-scooter-review-2018-4>, 28 pages.

Senese, "Vandals Crack Open Dockless Scooter, Discover Particle Electron Board Inside" Make on line], Apr. 25, 2018 (Retrieved from Internet Mar. 25, 2019), URL <https://makezine.com/2018/04/25/vandals-crack-open-dockless-scooter-discover-particle-electron-board-inside/>, 6 pages.

"The Micro-Mobility Revolution: The Introduction and Adoption of Electric Scooters in the United States", A Populus Research Report, Jul. 2018, 18 pages.

Vock, "Scooters Are Suddenly Everywhere. What Should Cities Be Doing About It?" Governing, Nov. 27, 2018 (Retrieved from Internet Mar. 25, 2019), URL <https://www.governing.com/topics/transportation-infrastructure/gov-electric-scooters-bird.html>, 5 pages.

International Search Report for PCT International Application No. PCT/IB2020/054792 mailed on Sep. 28, 2020, 5 pages.

\* cited by examiner

INCENTIVE-DRIVEN ROADWAY CONDITION MONITORING FOR IMPROVED SAFETY OF MICROMOBILITY DEVICE OPERATION

CROSS REFERENCE TO RELATED APPLICATIONS

This application is a national stage filing under 35 U.S.C. 371 of PCT/IB2020/054792, filed May 20, 2020, which claims the benefit of Provisional Application No. 62/852,489, filed May 24, 2019, the disclosure of which is incorporated by reference in its/their entirety herein.

TECHNICAL FIELD

The present application relates generally to electrically powered scooters and roadway infrastructure.

BACKGROUND

Electric scooters are often used to transport people over relatively short distances. A user of an electric scooter typically rides the scooter on a roadway, street, pathway or a sidewalk, and frequently may use the scooter in urban or campus settings as a convenient mode of transportation. In many situations, the roadway/street used by the scooter (or adjacent to the path or lane used by the scooter) may by occupied by vehicles travelling at relatively high speeds compared to the scooter. Moreover, sidewalks are often occupied by pedestrians travelling at relatively low speeds compared to the scooter. Navigating roadways, streets, paths and/or sidewalks may pose a risk to the safety of the user of the electric scooter, occupants of a vehicle, pedestrians, or any other person, pet, or property in proximity to the scooter.

DETAILED DESCRIPTION

Figure 1:
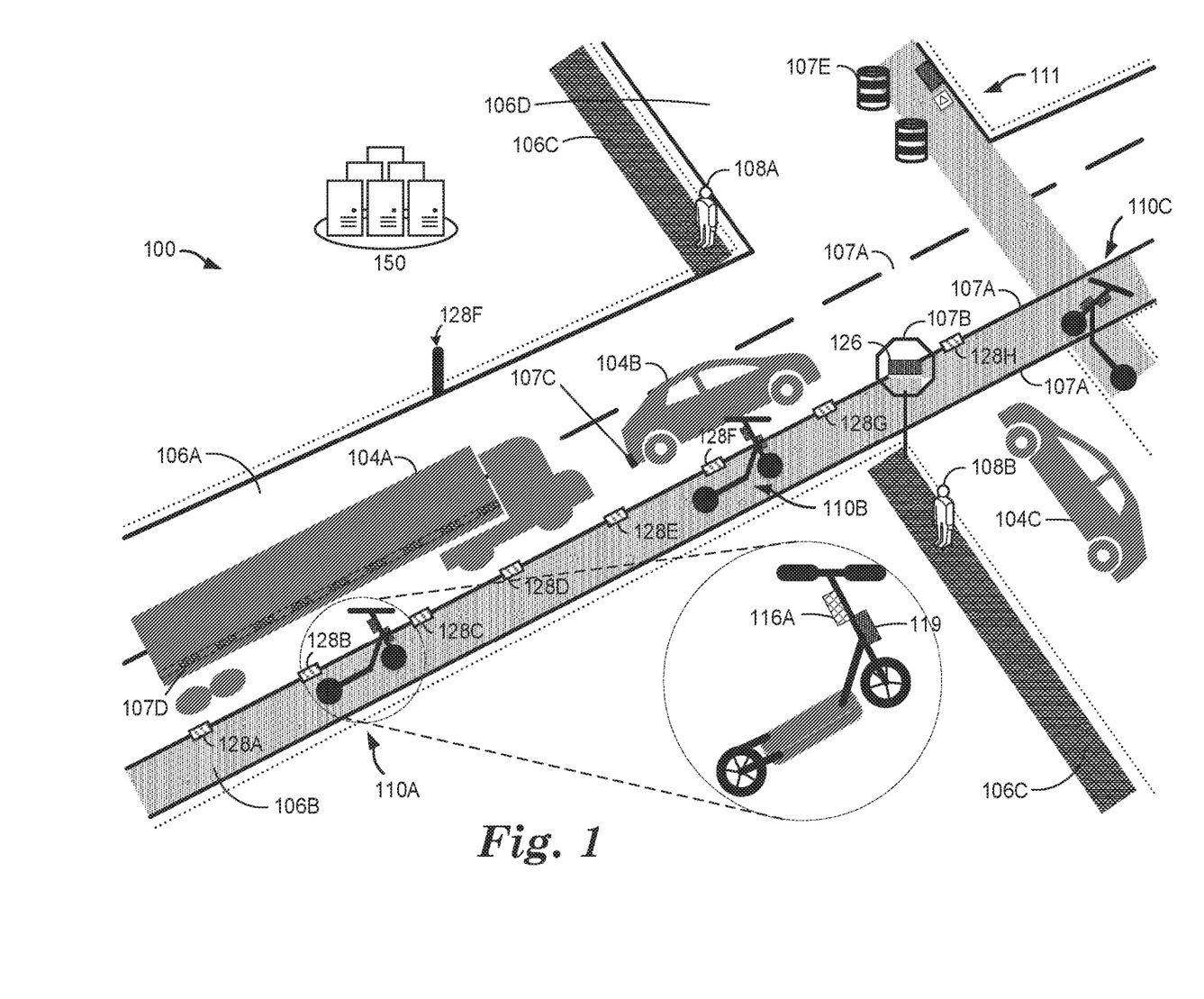
FIG. 1 is a conceptual diagram illustrating an example physical environment having transportation system that includes one or more electrically powered scooters, in accordance with techniques of this disclosure.

FIG. 1 is a conceptual diagram illustrating an example physical environment having a transportation system that includes one or more electrically powered scooters, in accordance with techniques of this disclosure. In the example of FIG. 1, the transportation system 100 includes a variety of different infrastructure elements (generally referred to as "infrastructure"). As shown in the example of FIG. 1, the infrastructure may include dedicated transportation pathways 106A-106D (collectively, transportation pathways 106) as well as infrastructure articles 107A-107E (collectively, infrastructure articles 107) positioned and oriented within the environment.

As shown in FIG. 1, system 100 includes one or more micro-mobility devices. Examples of micro-mobility devices include electrically-powered food delivery devices, electrically powered hoverboards or skateboards, electrically powered scooters 110A-110C (collectively, electrically powered scooters 110), or other small-profile devices that may use or travel upon a roadway or sidewalk. Electrically powered scooters 110 (also referred to herein simply as scooters 110) may operate on transportation pathways 106. As described in more detail with reference to FIG. 3, in this example, electrically powered scooters 110 includes a chassis, a front wheel, a back wheel, an electric motor, a steering assembly, and a battery 119. In this example, the chassis includes a rear-wheel mount at one end of the chassis, a front-wheel mount at another end of the chassis that is opposite the rear-wheel mount, and a chassis support extending horizontally between the rear-wheel mount and the front-wheel mount. The front and rear wheels are mounted to the front and rear wheel mounts of the chassis, respectively. The front wheel mount is coupled to a steering assembly. In some examples, the steering assembly includes handlebars such that turning the handle bars causes the front wheel to turn. In some examples, the electric motor is physically coupled to the scooter chassis and is configured by a motor controller to drive at least one of the chassis-supported front wheel or chassis-supported rear-wheel for powered movement over a ground surface.

Examples of transportation pathways 106 include a vehicle pathway (e.g., pathway 106A, 106D), a bicycle pathway (e.g., pathway 106B), or a pedestrian pathway (e.g., pathway 106C), among others. In other examples, transportation pathways 106 may be sidewalks, public spaces, or other surfaces not specifically dedicated to certain types of vehicles or traffic. Vehicle pathways (e.g., 106A) may be used by vehicles 104A-104C (collectively, vehicles 104) to transport people or goods. Examples of vehicles 104 include automobiles (e.g., 104B, 104C) such as cars, trucks, passenger vans; buses; motorcycles; recreational vehicles (RVs); or lorries (e.g., 104A), etc. Examples of vehicle pathways can also include alleys, streets, and highways (or a vehicle specific portion thereof, such as a vehicle driving lane), among others. Bicycle pathways (e.g., 106B) may be used by bicycles or vehicles and bicycles. Examples of bicycle pathways include a street or a portion of a street designated for bicycles, a bicycle trail, among others. In some instances, a pedestrian pathway (e.g., 106C) is primarily used by pedestrians 108. Examples of pedestrian pathways include a pedestrian sidewalk or a jogging path. In some examples, one of transportation pathways 106 may include two or more different types of pathways. For instance, transportation pathway 106A may include a vehicle driving lane of a vehicle pathway and a bicycle pathway adjacent to the driving lane. Transportation pathways 106 may include portions not limited to the respective pathways themselves. In the example of transportation pathway 106A (e.g., a vehicle pathway), transportation pathway 106 may include the road shoulder, physical structures near the pathway such as toll booths, railroad crossing equipment, traffic lights, guardrails, and generally encompassing any other properties or characteristics of the pathway or objects/structures in proximity to the pathway.

Examples of infrastructure articles include a pavement marking (e.g., infrastructure article 107A), a roadway sign (e.g., infrastructure article 107B), a license plate (e.g., infrastructure article 107C), a conspicuity tape (e.g., infrastructure article 107D), and a hazard marker (e.g., infrastructure article 107E, such as a construction barrel, a traffic cone, a traffic barricade, a safety barrier, among others). Pavement markings may include liquid markings, tape, or raised pavement markings to name only a few examples. In some examples, pavement markings may include sensors, materials, or structures that permit the detection of the marking and/or communication of information between the pavement marking and a receiving device. Additional examples of infrastructure articles 107 include traffic lights, guardrails, billboards, electronic traffic sign (also referred to as a variable-message sign), among others. Infrastructure articles 107 may include information that may be detected by one or more sensors of computing device 116. Infrastructure articles, such as pavement marking 128A-128H may be configured to perform operations, such as described in the provisional application No. 62/852,500, entitled "OPERATOR PROFICIENCY-BASED INFRASTRUCTURE ARTICLES", filed May 24, 2019, the contents of which are incorporated herein by reference in its entirety.

In some examples, an infrastructure article, such as infrastructure article 107B, may include an article message 126 on the physical surface of the infrastructure article. Article message 126 may include characters, images, and/or any other information that may be printed, formed, or otherwise embodied on infrastructure article 107B. For example, each infrastructure article 107 may have a physical surface having an article message 126 embodied thereon. Article message 126 may include human-perceptible information and machine-perceptible information.

Human-perceptible information may include information that indicates one or more first characteristics of a pathway, such as information typically intended to be interpreted by human drivers. In other words, the human-perceptible information may provide a human-perceptible representation that is descriptive of at least a portion of the transportation pathway. As described herein, human-perceptible information may generally refer to information that indicates a general characteristic of a transportation pathway and that is intended to be interpreted by a human driver. For example, the human-perceptible information may include words (e.g., "STOP" or the like), symbols, graphics (e.g., an arrow indicating the road ahead includes a sharp turn) or shapes (e.g., signs or lane markings). Human-perceptible information may include the color of the article, the article message or other features of the infrastructure article, such as the border or background color. For example, some background colors may indicate information only, such as "scenic overlook" while other colors may indicate a potential hazard (e.g., the red octagon of a stop sign, or the double yellow line of a no passing zone).

In some instances, the human-perceptible information may correspond to words or graphics included in a specification. For example, in the United States (U.S.), the human-perceptible information may correspond to words or symbols included in the Manual on Uniform Traffic Control Devices (MUTCD), which is published by the U.S. Department of Transportation (DOT) and includes specifications for many conventional signs for roadways. Other countries have similar specifications for traffic control symbols and devices.

Machine-perceptible information may generally refer to information configured to be interpreted by an electrically powered scooter. For example, article message 126 may be encoded via a 2-dimensional bar code, such as a QR code. In some examples, machine-perceptible information may be interpreted by a human driver. In other words, machine-perceptible information may include a feature of the graphical symbol that is a computer-interpretable visual property of the graphical symbol. In some examples, the machine-perceptible information may relate to the human-perceptible information, e.g., provide additional context for the human-perceptible information. In an example of an arrow indicating a sharp turn, the human-perceptible information may be a general representation of an arrow, while the machine-perceptible information may provide an indication of the shape of the turn including the turn radius, any incline of the roadway, a distance from the sign to the turn, or the like. The additional information may be visible to a human operator; however, the additional information may not be readily interpretable by the human operator, particularly at speed. In other examples, the additional information may not be visible to a human operator but may still be machine readable and visible to a vision system of an electrically powered scooter. In some examples, an enhanced infrastructure article may be an optically active article in that the infrastructure article is readily detectable by vision systems, which may include an infrared camera or other camera configured for detecting electromagnetic radiation in one or more bands of the electromagnetic spectrum, which may include the visible band, the infrared band, the ultraviolet band, and so forth. For example, the infrastructure articles may be reflective, such as retroreflective, within one or more bands of the electromagnetic spectrum that are readily detectable by visions systems of the computing device 116.

Article message 126 may indicate a variety of types of information. In some examples, article message 126 may, for instance, provide computing device 116 with static information related to a region of a pathway 106. Static information may include any information that is related to navigation of the pathway associated with article message 126, and not subject to change. For example, certain features of pathways 106 may be standardized and/or commonly used, such that article message 126 may correspond to a pre-defined classification or operating characteristic of the respective pathway. As some examples, article message 126 may indicate a navigational characteristic or feature of the pathway, an operating rule or set of operating rules of the pathway, or the like.

Infrastructure articles 107 may include a variety of indicators and/or markers. For example, infrastructure article 107 may include one or more of an optical tag, a radio-frequency identification tag, a radio-frequency tag, an acoustic surface pattern, or a material configured to provide a signature to a signature-sending system. In some examples, electrically powered scooters 110 may receive data from infrastructure articles 107 via near-field communication (NFC) protocols and signals, laser, or infrared-based readers, or other communication type.

Electrically powered scooters 110 may each include one or more sensors that perceive characteristics of the environment, roadway, infrastructure, and other objects around electrically powered scooter 110A. Examples of sensors include an image sensor, sonar, LiDAR, among others. The sensors may generate sensor data indicative of sensed characteristics. For example, the sensor data may include infrastructure data indicative of the infrastructure proximate to a respective scooter of electrically powered scooters 110. An object may be proximate to a particular electrically powered scooter 110 when the object is detectable by one or more sensors of particular electrically powered scooter 110. As one example, the infrastructure data may be indicative of one or more infrastructure articles 107 proximate to a respective scooter of electrically powered scooters 110.

In accordance with techniques of this disclosure, micromobility devices may determine roadway conditions for portions of roadways, which may be propagated to other micromobility devices that may operate on the same portions of the roadways. More specifically, techniques of the disclosure may determine roadway conditions that are applicable to electrically powered scooters but may not be applicable to other types of vehicles on the roadway such as automobiles or tractor trailers. For instance, certain types of roadway conditions, such as surface irregularities, may not pose a safety risk to automobiles but may pose a safety risk to electrically powered scooters. As an example, certain surface irregularities may not pose a safety risk to an automobile because an automobile, unlike an electrically powered scooter, may have a suspension that absorbs impacts from the particular surface irregularities. The automobile may also have additional wheels providing a more stability to the vehicle than an electrically powered scooter, and a different center of gravity for the driver. Certain surface irregularities may not pose a safety risk to an automobile automobile's larger mass relative to the surface irregularity when compared to an electrically powered scooter.

Using techniques of this disclosure, one or more sensors of a micromobility device may determine roadway condition data that indicates a roadway condition for the particular portion of the roadway on which the micromobility device has traversed and where other micromobility devices may traverse in the future. This roadway condition data may be used to inform or notify other micromobility devices and/or operators of such devices of the roadway conditions or safety risks associated with the roadway conditions. Because the roadway condition data may be generated with sensors from a micromobility device as the micromobility device is traversing a portion of the roadway, the roadway condition data may be used to more accurately and/or more precisely capture roadway conditions that are applicable to other micromobility devices and more accurately identify safety risks for other micromobility devices.

In some examples, the sensors of a micromobility device may generate or determine road conditions at a physical resolution at which the roadway condition is applicable or otherwise usable by another electrically powered scooter to identify safety risks. For instance, an accelerometer configured at an electrically powered scooter riding over an irregular road surface may generate a set of accelerometer data based on acceleration measurements resulting from the irregular road surface features with higher physical resolution (e.g., higher degree of sensitivity) than an automobile may be capable of measuring due to differences in mass, suspension, center of gravity, or other physical differences between the electrically powered scooter and the automobile. As such, road condition data generated by micromobility devices in accordance with techniques of this disclosure may be more applicable and/or useful to other micromobility devices and operators for identifying safety risks than road condition data generated by other types of vehicles such as automobiles or tractor-trailers. Accordingly, techniques of this disclosure may reduce safety risks for micromobility devices.

As further described in this disclosure, techniques may incentivize micromobility drivers to traverse certain portions of roadways to obtain roadway condition data. As an example, in a set of roadways, certain portions of the roadways may be traversed less frequently than others. Techniques of this disclosure may indicate to operators of micromobility devices, certain portions of roadways, that if traversed by the operators, will result in incentives being provided to the operators. Although a quantity of rides or micromobility devices that have traversed a portion of the roadway may be used for incentivizing operators, other metrics may also be used as described in this disclosure (e.g., variability in road condition data, complexity of the portion of the roadway, to name only a few examples).

In operation, system 100 may include remote computing system 150. Remote computing system 150 may include a distributed computing platform (e.g., a cloud computing platform executing on various servers, virtual machines and/or containers within an execution environment provided by one or more data centers), physical servers, desktop computing devices, or any other type of computing system. In some examples, remote computing system 150 may receive and store usage data that includes a current location of electrically powered scooter 110A, whether the current location of electrically powered scooter 110A is permitted, a type of the current location (e.g., a transportation pathway 106, a park, a scooter parking zone, etc.), an amount of time that electrically powered scooter 110A has been in its current location, information indicating the occurrence of a scooter-specific event, among other information. In some examples, remote computing system 150 may store user data that includes data about an operator of a micromobility device. Remote computing system 150 may be operated or controlled by an operator of a fleet of micromobility devices. Remote computing system 150 may manage fares for usage of micromobility devices. As further described in this disclosure, remote computing system 150 may determine one or more routes for micromobility devices.

In accordance with techniques of this disclosure, remote computing system 150 may receive roadway condition data from electrically powered scooter 110A for a particular portion of a roadway 106B. In some examples, a portion of a roadway may be a region of a roadway or part of a roadway. In some examples, the portion of the roadway may include a subset of the entire roadway or may include the entire roadway. A roadway may be a street, highway, sidewalk, alley, or other drivable surface.

The roadway condition data may indicate a roadway condition for the particular portion of the roadway. In some examples, a roadway condition may be any physical characteristic, feature, or object of a roadway or near a roadway. In some examples, a road condition indicates at least one of a roadway surface defect (e.g., crack, pothole, shoving, upheaval, or raveling (very porous asphalt), to name only a few examples), roadway surface property (e.g., curb, impression, presence of debris (e.g., sand, asphalt pieces, etc) to name only a few examples), roadway infrastructure, or precipitation accumulation (e.g., standing water, ice, moving water, to name only a few examples).

As described above electrically powered scooters may include one or more sensors to perceive characteristics, including roadway conditions, of the environment, roadway, infrastructure, and other objects around electrically powered scooter 110A. For instance, electrically powered scooter 110A may include an accelerometer and an image sensor. The accelerometer may measure changes in acceleration experienced by electrically powered scooter 110A as it encounters or otherwise physically experiences road conditions, such as surface defects, surface properties, roadway infrastructure, and precipitation accumulation. The image capture device may generate image data that represents a field of view of the image capture device. The image capture device may apply image recognition techniques to the image data to identify road conditions, such as surface defects, surface properties, roadway infrastructure, and precipitation accumulation.

Computing device 116A may send roadway condition data to remote computing device 150. In some examples, roadway condition data may include raw data captured from sensors at electrically powered scooter 110A. In some examples, roadway condition data may include metadata or parameterized data that is representative of the raw data captured from the sensors at electrically powered scooter 11A. For instance, computing device 116A may process the raw sensor data to generate information representative of the raw sensor data, such as but not limited to statistics about roadway conditions (e.g., counts, averages, medians, standard deviations, trends, rates of change, to name only a few examples), labels or types of roadway conditions, or any other parameterizations or descriptions based on the raw sensor data.

Remote computing system 150 may receive and store the roadway condition data. In some examples, remote computing system 150 may associate metadata with the roadway condition data. For instance, remote computing system 150 may associate metadata with the roadway condition data, such as but not limited to: timestamp when roadway condition data are generated; identifier of user account for operator that generated roadway condition data; identifier of electrically powered scooter used to generate roadway condition; or location where roadway condition data are generated, to name only a few examples.

Remote computing system 150 may generate, based at least in part on the roadway condition for the particular portion of the roadway, data usable by computing devices associated with others electrically powered scooter to traverse the particular portion of a roadway. For instance, remote computing system 150 may generate data that indicates various roadway conditions at various locations of the particular portion of the roadway. This data may be sent by remote computing system 150 to computing devices associated with other electrically powered scooters in proximity to the particular portion of the roadway. For instance, the remote computing system 150 may determine other electrically powered scooters and/or computing devices of operators of such scooters that are within a threshold distance of the particular portion of the roadway. One or more of these electrically powered scooters and/or computing devices of operators may receive the data generated based on various roadway conditions at various locations of the particular portion of the roadway.

Other electrically powered scooters and/or computing devices of operators that receive the data generated based on various roadway conditions at various locations of the particular portion of the roadway may use the data to perform one or more operations. For example, the one or more operations may include generating an output such as at least one of visual output, audible output, or haptic output. In some examples, the one or more operations may include changing operations of the electrically powered scooter, such as braking, acceleration, steering or any other operations. In some examples, the one on or more operations may include outputting one or more messages to other devices such as vehicles (e.g., automobiles, electrically powered scooters, etc.), infrastructure articles, or other devices in proximity to the electrically powered scooter.

As described herein, certain techniques of the disclosure may determine roadway conditions that are applicable to electrically powered scooters but may not be applicable to other types of vehicles on the roadway. For instance, electrically powered scooters may be a first type of vehicle and an automobile may be a second type of vehicle. In such examples, a roadway condition may applicable to electrically powered scooters based at least in part on the physical resolution of the roadway condition; however, the roadway condition may not be applicable to the automobile based at least in part on the physical resolution of the roadway condition. The physical resolution of the roadway condition may include at least one of a size, type, or location of the roadway condition. As an example, indentations from raveling (very porous asphalt) in a roadway surface may not be applicable to the automobile because the indentations are not physically large enough to create a safety risk to the automobile. However, indentations from the raveling (very porous asphalt) in the roadway surface may be applicable to the electrically powered scooter because the indentations are physically large enough to create a safety risk to the electrically powered scooter, for example, through jarring, impacts, or vibration that may cause the operator to lost control of the scooter and/or experience discomfort operating the scooter.

In some examples, the physical resolution of the roadway condition comprises at least one of the size, type, or the location of the roadway condition relative to the size, speed, or operating capability of the at least one of the first or second electrically powered scooters. For instance, a size of an upheaval in a road surface may be larger relative to the electrically powered scooter than to an automobile. As such the physical resolution of the road surface may be based on characteristics or features of the roadway condition relative to characteristics or features of the electrically powered scooter. In some examples, an operating capability of an electrically powered scooter comprises at least one of a suspension, braking, accelerating or turning capability of the at least one of the first or second electrically powered scooters.

As described herein, techniques implemented by one or more computing devices may incentivize micromobility drivers to traverse certain portions of roadways to obtain roadway condition data. For instance, remote computing system 150 may determine a set of roadways and/or portions of roadways, such as from a map or other source. Remote computing system 150 may determine a metric associated a portion of a roadway. For example, a roadway may be a street comprised of a set of portions, wherein each portion corresponds to a city-block length of the roadway.

Remote computing system 150 may associate a metric with the portion of the roadway. Example metrics may include, but are not limited to: a quantity of electrically powered scooters that have traversed at least the portion of the roadway; a frequency that electrically powered scooters have traversed at least the portion of the roadway; no electrically powered scooters have traversed at least the portion of the roadway; a variability in roadway condition data indicates the roadway condition for the particular portion of the roadway; or a risk metric that indicates a risk for an electrically powered scooter that traverses at least the portion of the roadway. In some examples, the metric may be a discrete value, an integer or non-integer value, or any other value that may characterize a portion of a roadway.

To incentivize operators to traverse certain portions of roadways, remote computing system 150 may determine a metric associated with the portion of the roadway. For instance, remote computing system 150 may determine, for a set of metrics for portions of roadways, which portions should be recommended for traversing (collectively, a route)

by operators of electrically powered scooters. As an example, remote computing system 150 may determine a set of metrics for a set of respective portions of roadways and rank or sort the metrics based on magnitude of the metric. If the metric for the roadway that was traversed the fewest number of times is the smallest metric, then remote computing system 150 may associate an incentive with this metric. In other examples, the metric scale may be inverted (e.g., fewest number of times is the highest metric). Any number of other metrics for respective roadways with higher magnitudes in sorted order may also be associated with incentives by computing system 150.

Remote computing system 150 may select a threshold number of portions of roadways where the metric for each selected portion satisfies a threshold. Remote computing system 150 may send a recommendation to traverse a portion of a roadway to one or more operators or potential operators of electrically powered scooter in proximity to the portion of the roadway. The recommendation may include information about the portion of the roadway (e.g., a route) and information that indicates the incentive if an operator traverses the portion of the roadway. Although the prior example described a technique for selecting from a set of metrics that are sorted based on magnitude, other techniques may be used such as graph algorithms that traverse edges (which correspond to portions of roadways) where the edges have weights (which correspond to metrics for the portions of roadways). Example techniques include maximum flow algorithms or other graph optimization algorithms.

In some examples, an incentive for an operator of an electrically powered scooter for traversing at least the portion of the roadway may be an incentive to reduce the cost of operation of an electrically powered scooter. For instance, the incentive may be a fare reduction, credit, or discount. In other instances, an incentive may be access to certain portions of roadways, access to a certain type of electrically powered scooter (e.g., a scooter with additional features or functions), or priority to access an electrically powered scooter. In still other examples, an incentive may be any reward or offering of value.

Remote computing system 150 may receive data from an electrically powered scooter that indicates the scooter traversed one or more portions of roadway. In this way, remote computing system 150 may determine whether to release an incentive to an account of a particular operator of an electrically powered scooter for traversing a portion of a roadway associated with the incentive. Accordingly, in response to processing data that indicates an electrically powered scooter has traversed a portion of a roadway that is associated with an incentive, remote computing device 150 may receives the incentive for the particular portion of the roadway.

In some examples, remote computing system 150 may facilitate and provide gamification for traversing particular portions of roadways. Gamification for traversing particular portions of roadways may refer to the application of elements of game playing (e.g. point scoring, competition with others, rules of play) to the activity of traversing particular portions of roadways. For instance, portions of roadways may have metrics associated with the respective portions, and point values may be associated with the portions of roadways based on the metrics. For instance, the point values may be proportional the metrics (either directly or inversely). As an example, a portion of a roadway with a metric having the lowest magnitude (e.g., least frequently traversed) may have the highest point value, and the roadway with a metric having the highest magnitude (e.g., most frequently traversed) may have the lowest point value. Accounts managed by remote computing system 150 for operators may retain cumulative point values and operators may be incentivized to collect more points from particular portions of roadways. In this way, as operators seek to collect more points using electrically powered scooters on portions of roadways, roadway condition data may be collected by the scooters and distributed to other operators in a competition. In some examples, a "streak", or sequence of uninterrupted point collections by an operator, may be determined by remote computing system 150 and/or shared with other operators. For instance, remote computing system 150 may generate an incentive whereby the user is shown a graphic, icon or emoji to indicate that they have been collecting data on new roadways each day (or week) for X days (or X weeks). Computing devices may output this information to operators and or friends/contacts in a social network, in the form of competition.

As described herein, roadway condition data of one electrically powered scooter may be used to generated data usable another electrically powered scooter to traverse a particular portion of the roadway. This data usable by another electrically powered scooter to traverse a particular portion of the roadway may cause a computing device associated with that electrically powered scooter to generate an output that informs the operator of the electrically powered scooter of a road condition. For instance, the output may be one of visual output, audible output, or haptic output. In some examples, the output is emitted prior to the electrically powered scooter reaching the location of the road condition.

In some examples, the roadway condition data may be used to determine whether characteristics of the roadway comply with or satisfy one or more specifications or regulations. For instance, specifications or regulations may specify certain requirements for portions of roadways, such as necessary infrastructure articles (e.g., signs, pavement markings, etc.). Remote computing device 150 may determine whether a portion of a roadway is compliant with or satisfies specifications or regulations by comparing roadway condition data to data representing the specifications or regulation. In some examples, the specifications or regulations may include roadway inclination, lateral acceleration over turn, or other physical features of a roadway that may be subject to a specification or regulation. In some examples, remote computing device 150 may perform one or more operations based at least in part on whether the roadway conditions comply with or satisfy one or more specifications. Example operations may include generating a report, generating an alert, storing a result from the determination, or sending a message.

In some examples, a metric may indicate a degree of complexity or difficulty to traverse a particular portion of a roadway. Remote computing system 150 may generate routes for operators that avoid certain portions based on metrics associated with such portions of roadways. For instance, remote computing system 150 may determine that an operator is inexperienced or at higher risk for operating on particular portions of roadways based on an operator profile and metrics for the particular portions. Accordingly, remote computing system 150 may recommend routes to operators that to include certain portions of roadways with metrics indicating a threshold degree of complexity or difficulty.

While computing device 116A is described with respect to a dynamically controlling scooter 110A, techniques of this disclosure may also be used for computing devices to control any other type of micro-mobility device, such as a powered food-delivery device, hoverboard, or skateboard. In still other examples, techniques of this disclosure may also be used for any other type of vehicle, such as an automobile.

Figure 2:
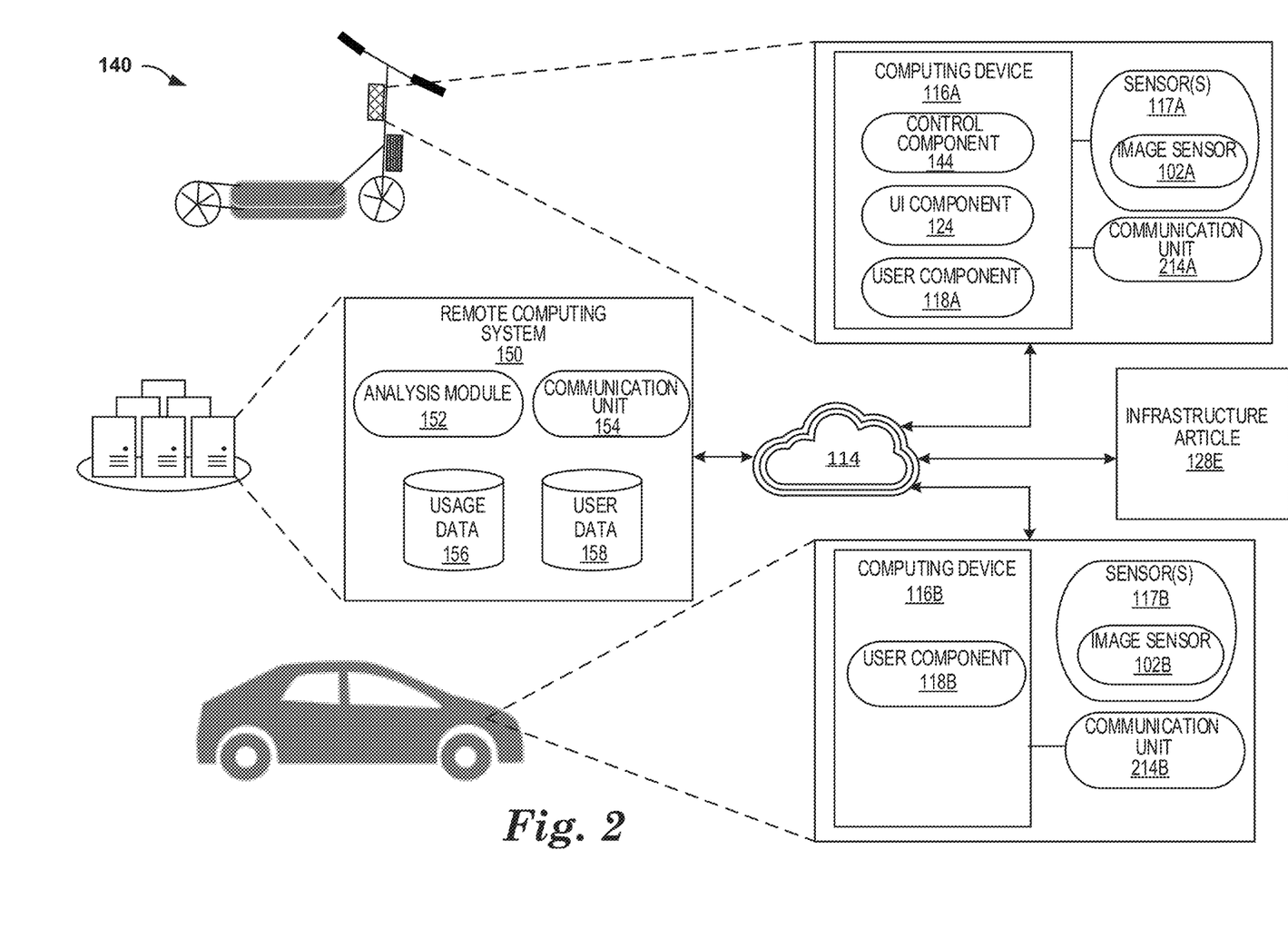
FIG. 2 is a block diagram illustrating an example system for improving safety associated with an electrically powered scooter, in accordance with techniques of this disclosure.

FIG. 2 is a block diagram illustrating an example system for improving safety associated with an electrically powered scooter, in accordance with techniques of this disclosure. System 140 illustrates additional details of system 100 of FIG. 1. In the examples of FIG. 2, system 140 includes electrically powered scooter 110A, vehicle 104B, and a remote computing system 150. In some examples, the devices shown in FIG. 2 are communicatively coupled to one another via network 114. In some examples, the devices shown in FIG. 2 are communicatively coupled to one another directly, for example, via a DSRC transceiver.

Electrically powered scooter 110A includes computing device 116A and vehicle 104B include computing device 116B. Computing devices 116A, 116B (collectively, computing devices 116) may each include one or more communication unit 214A, 214B, and sensors 117A, 117B, respectively. Although computing device 116A is shown as attached to electrically powered 110A, in other examples, functionality of computing device 116A may be included in a computing device (e.g., smartphone, smartwatch, wearable, or other portable computing device) that is associated with the operator of electrically powered scooter 100. In such examples, computing device 116A and the computing device that is associated with the operator of electrically powered scooter 100 may communicate with one another and/or one or more other computing devices.

Communication units 214A, 214B (collectively, communication units 214) of computing devices 116 may communicate with external devices by transmitting and/or receiving data. For example, computing device 116 may use communication units 214 to transmit and/or receive radio signals on a radio network such as a cellular radio network or other networks, such as networks 114. In some examples communication units 214 may transmit and receive messages and information to other vehicles, such as information interpreted from infrastructure article 107. In some examples, communication units 214 may transmit and/or receive satellite signals on a satellite network such as a Global Positioning System (GPS) network. In some examples, communications units 214 may transmit and/or receive data through network 114 to remote computing system 150 via communication unit 154.

Sensors 117A, 117B (collectively, sensors 117) may image sensors 102A, 102B (collectively, image sensors 102), temperature sensors, LiDAR, or a combination thereof, to name only a few examples of sensors. Examples of image sensors 102 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In one example, electrically powered scooter 110A or vehicle 104B includes at least two different sensors for detecting light in two different wavelength spectrums. Image sensors 102 may have a fixed field of view or may have an adjustable field of view. An image sensor 102 with an adjustable field of view may be configured to pan left and right, up and down relative to electrically powered scooter 110 or vehicle 104B as well as be able to widen or narrow focus. In some examples, image sensors 102 may include a first lens and a second lens. Electrically powered scooter 110 and/or vehicle 104B may have more or fewer image sensors 102 in various examples.

In the example of FIG. 2, computing device 116A includes an interpretation component 118, a user interface (UI) component 124, and a control component 144. Components 118A, 124, and 144 may perform operations described herein using software, hardware, firmware, or a mixture of both hardware, software, and firmware residing in and executing on computing device 116 and/or at one or more other remote computing devices. In some examples, components 118A, 124, and 144 may be implemented as hardware, software, and/or a combination of hardware and software.

Computing device 116A may execute components 118A, 124, and 144 with one or more processors. Computing device 116A may execute any of components 118A, 124, 144 as or within a virtual machine executing on underlying hardware. Components 118A, 124, 144 may be implemented in various ways. For example, any of components 118A, 124, 144 may be implemented as a downloadable or pre-installed application or "app." In another example, any of components 118A, 124, 144 may be implemented as part of an operating system of computing device 116.

UI component 124 may include any hardware or software for communicating with a user of electrically powered scooter 110. In some examples, UI component 124 includes outputs to a user such as displays, such as a display screen, indicator or other lights, audio devices to generate notifications or other audible functions, and/or haptic feedback devices. UI component 124 may also include inputs such as knobs, switches, keyboards, touch screens or similar types of input devices.

In general, sensors 117 may be used to gather information about infrastructure and roadway conditions proximate to electrically powered scooter 110A and vehicle 104B, such as information about transportation pathways 106. Sensors 117 may generate infrastructure data indicative of the infrastructure proximate to electrically powered scooter 110A or vehicle 104B. Sensors 117 may generate roadway condition data indicative of roadway conditions proximate to electrically powered scooter 110A or vehicle 104B. For example, image sensors 102 may capture images of infrastructure articles, such as lane markings, centerline markings, edge of roadway or shoulder markings, as well as the general shape of the transportation pathway. The general shape of a transportation pathway may include turns, curves, incline, decline, widening, narrowing or other characteristics.

Computing device 116A may include a user component 118A configured to perform techniques of this disclosure. For example, user component 118A may receive, via a remote computing system, data usable by user component 118A to traverse a particular portion of a roadway. In accordance with techniques of this disclosure, the data may be based at least in part on roadway condition data generated by another electrically powered scooter that indicates a roadway condition for the particular portion of the roadway. User component 118A may cause control component 144 to perform, based at least in part on the data usable by the computing device to traverse the particular portion of the roadway, at least one operation. In some examples, the at least one operation may include generating an output or changing an operation of a micromobility device. An output generated by user component 118A may include at least one of visual output, audible output, or haptic output. In some examples, the output may be based on or in response to a roadway condition that the micromobility device is approaching.

In some examples, user component 118A may determine roadway condition data for a particular portion of a roadway based on data from sensors 117, communication units 214 or the like. User component 118A may cause communication unit 214 to send, to the remote computing system, roadway condition data for the particular portion of the roadway. The roadway condition data may indicate a roadway condition for the particular portion of the roadway and is generated based at least in part on one or more sensors communicatively coupled to the computing device.

As described in the gamification example of FIG. 1, user component 118A may receive an indication of an incentive for an operator of the electrically powered scooter for traversing at least one portion of a roadway. That is, a computing device of an operator of an electrically powered scooter may receive information that indicates how many incentives another operator of an electrically powered scooter has collected or accumulated. By displaying the accumulated incentives of the other operator, user component 118A may create a competition between different operators to traverse different portions of roadways associated with incentives in the game.

While user component 118A of computing device 116A is described as performing various functionality of computing device 116A, in some examples, interpretation component 118B of computing device 116B may perform similar functionality. For example, user component 116B may determine roadway condition data from one or more of sensors 117B and/or communication unit 214B, either of which may interact with infrastructure article 128E. In some examples, user component 118B may receive data indicating roadway conditions for electrically powered scooter 110A from one or more devices, such as infrastructure article 128E, computing device 116A, and/or remote computing system 150.

Figure 3:
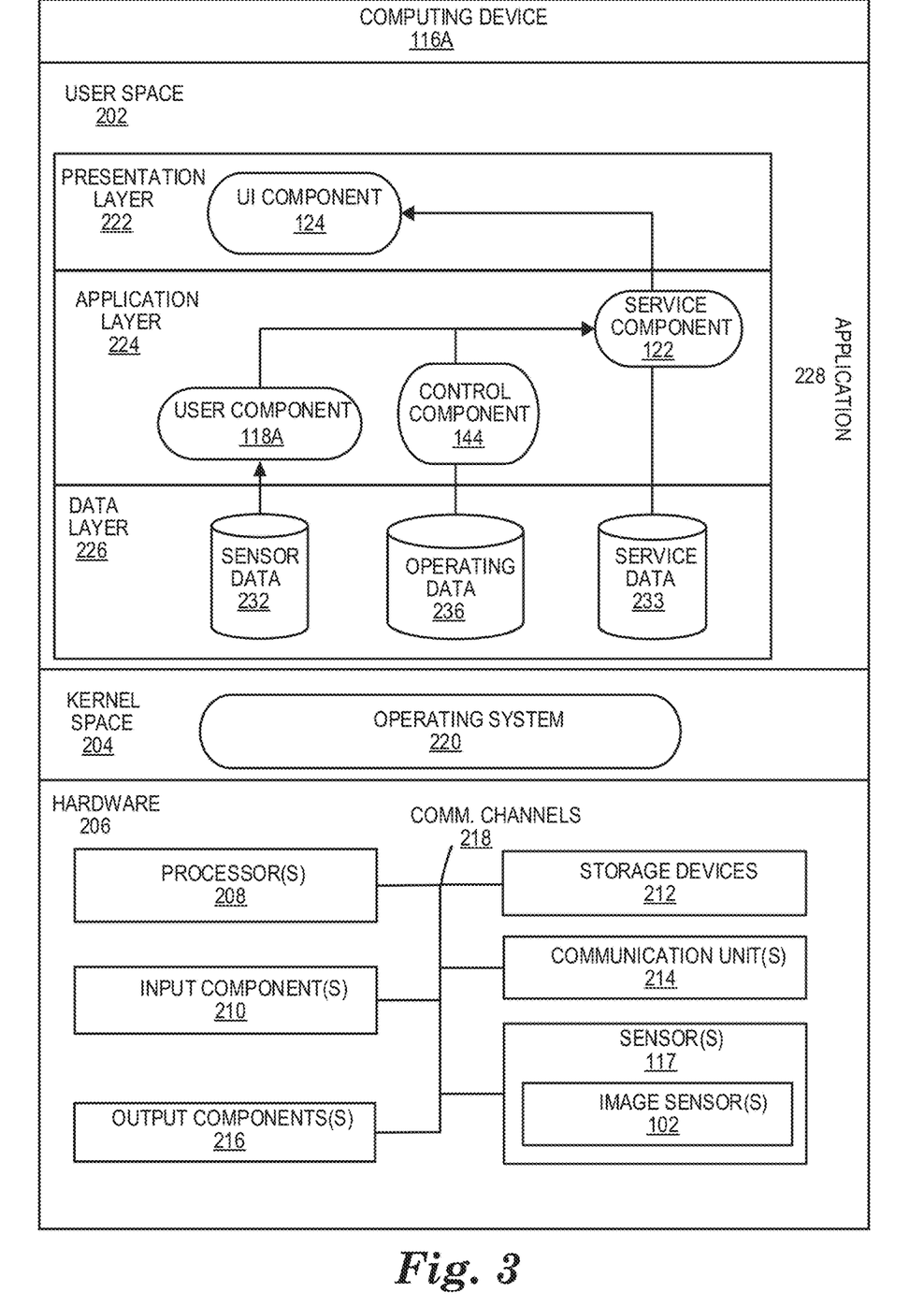
FIG. 3 is a block diagram illustrating an example computing device, in accordance with one or more aspects of the present disclosure.

FIG. 3 is a block diagram illustrating an example computing device, in accordance with one or more aspects of the present disclosure. FIG. 3 illustrates only one example of a computing device. Many other examples of computing device 116A may be used in other instances and may include a subset of the components included in example computing device 116A or may include additional components not shown example computing device 116A in FIG. 3.

As shown in the example of FIG. 3, computing device 116A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 3, hardware 206 includes one or more processors 208, input components 210, storage devices 212, communication units 214, output components 216, and sensors 117. Processors 208, input components 210, storage devices 212, communication units 214, output components 216, and sensors 1117 may each be interconnected by one or more communication channels 218. Communication channels 218 may interconnect each of the components 208, 210, 212, 214, 216, and 117 and other components for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within computing device 116A. For example, processors 208 on computing device 116A may receive and execute instructions stored by storage devices 212 that provide the functionality of components included in kernel space 204 and user space 202. These instructions executed by processors 208 may cause computing device 116A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of computing device 116A may receive input. Examples of input are tactile, audio, kinetic, and optical input, to name only a few examples. Input components 210 of computing device 116A, in one example, include a voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more communication units 214 of computing device 116A may communicate with external devices by transmitting and/or receiving data. For example, computing device 116A may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a DSRC transceiver, an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more output components 216 of computing device 116A may generate output. Examples of output are tactile, audio, and video output. Output components 216 of computing device 116A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as a liquid crystal display (LCD), a Light-Emitting Diode (LED) or any other type of device for generating tactile, audio, and/or visual output. Output components 216 may be integrated with computing device 116A in some examples.

In other examples, output components 216 may be physically external to and separate from computing device 116A but may be operably coupled to computing device 116A via wired or wireless communication. An output component may be a built-in component of computing device 116A located within and physically connected to the external packaging of computing device 116A (e.g., a screen on a mobile phone). In another example, a presence-sensitive display may be an external component of computing device 116A located outside and physically separated from the packaging of computing device 116A (e.g., a monitor, a projector, etc. that shares a wired and/or wireless data path with a tablet computer).

Output components 216 may also include control component 144, in examples where computing device 116A is onboard an electrically powered scooter. Control component 144 has the same functions as control component 144 described in relation to FIG. 1.

One or more storage devices 212 within computing device 116A may store information for processing during operation of computing device 116A. In some examples, storage device 212 is a temporary memory, meaning that a primary purpose of storage device 212 is not long-term storage. Storage devices 212 on computing device 116A may configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 3, application 228 executes in user space 202 of computing device 116A. Application 228 may be logically divided into presentation layer 222, application layer 224, and data layer 226. Presentation layer 222 may include user interface (UI) component 124, which generates and renders user interfaces of application 228. Application 228 may include, but is not limited to: UI component 124, interpretation component 118A, security component 120, and one or more service components 122. For instance, application layer 224 may interpretation component 118A, service component 122, and security component 120. Presentation layer 222 may include UI component 124.

Data layer 226 may include one or more datastores. A datastore may store data in structure or unstructured form. Example datastores may be any one or more of a relational database management system, online analytical processing database, table, or any other suitable structure for storing data.

Service data 233 may include any data to provide and/or resulting from providing a service of service component 122. For instance, service data 233 may include information about infrastructure articles 107, user information, operating rule sets, or any other information transmitted between one or more components of computing device 116A. Operating data 236 may include instructions for scooter operating rule sets for operating electrically powered scooter 110A.

Sensor data 232 may include infrastructure and/or road condition data, such as image data, signature data, or any other data indicative of infrastructure proximate to electrically powered scooter 110A. For example, communication units 214 may receive, from an image sensor 102, image data indicative of infrastructure and/or road conditions proximate to electrically powered scooter 110A and may store the image data in sensor data 232. Image data may include one or more images that are received from one or more image sensors, such as image sensors 102. In some examples, the images are bitmaps, Joint Photographic Experts Group images (JPEGs), Portable Network Graphics images (PNGs), or any other suitable graphics file formats. In some examples, the image data includes images of one or more road conditions and/or infrastructure articles 107 of FIG. 1. In one example, the image data includes images of one or more article message 126 associated with one or more infrastructure articles 107.

In some examples, user component 118A causes control component 144 to adjust control of electrically powered scooter 110A based on data received from one or more devices such as a remote computing system or infrastructure article. For example, interpretation component 118A may cause control component 144 to adjust operation of the electric motor and/or adjust operation of the braking assembly (e.g., to adjust a speed of electrically powered scooter 110A). In some examples, user component 118A causes control component 144 to adjust control of electrically powered scooter 110A based on data generated by one or more components or modules in computing device 116A.

In accordance with techniques of this disclosure, user component 118A may receive data usable by an electrically powered scooter to traverse a particular portion of a roadway. The data may be based at least in part on roadway condition data generated by a different electrically powered scooter that indicates a roadway condition for the particular portion of the roadway. User component 118A may cause control component 144 to perform, based at least in part on the data to traverse the particular portion of the roadway, at least one operation. Example operations may include generating an output, sending a message, and/or changing an operation of the electrically powered scooter. In some examples, user component 118A may send, to a remote computing system, roadway condition data for a particular portion of the roadway, wherein the roadway condition data indicates a roadway condition for the particular portion of the roadway and is generated based at least in part on one or more sensors 117 communicatively coupled to the computing device.

Figure 4:
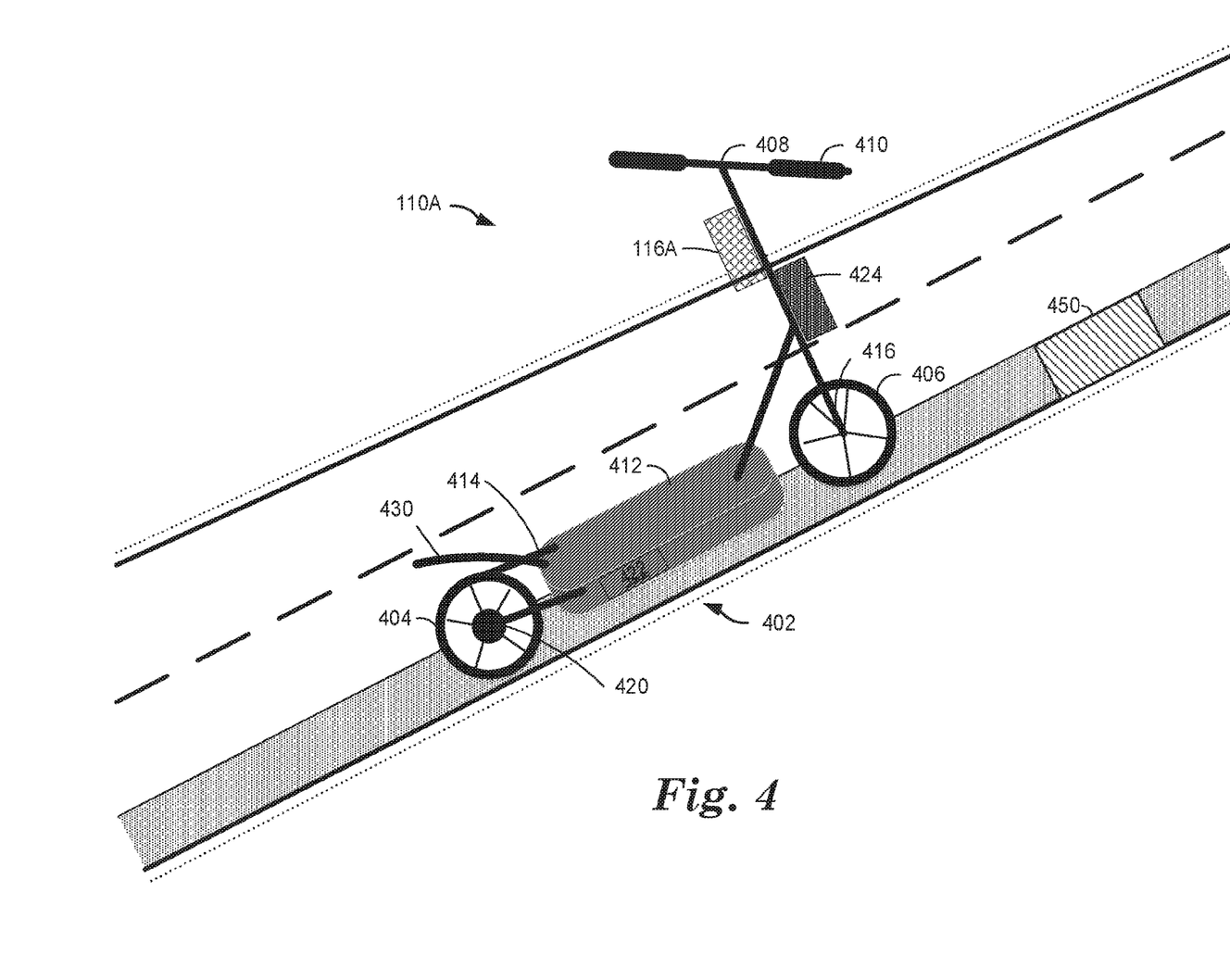
FIG. 4 is a conceptual diagram of an electrically powered scooter, in accordance with techniques of this disclosure.

FIG. 4 is a conceptual diagram of an electrically powered scooter 110A, in accordance with techniques of this disclosure. Electrically powered scooter 110A include a chassis 402, a rear wheel 404, a front wheel 406, and a steering assembly 408. Chassis 402 includes chassis support member 412 extending substantially horizontally between a rear-wheel mount 414 at one end of chassis 402 and a front-wheel mount 416 at another end of chassis 402 that is opposite the rear-wheel mount 414.

In the example of FIG. 4, rear wheel 404 is mounted to rear wheel mount 414 and front wheel 406 is mounted to front wheel mount 416. Front wheel 406 is mounted to front wheel mount 416 for turning steering movement with respect to the front wheel mount 406 and rear wheel 404. Front wheel mount 416 may be coupled to steering assembly 408. Steering assembly 408 may extend generally vertically relative to chassis support member 412. Steering assembly may be angled relative to chassis support member 412. In one example, an angle between chassis support member 412 and steering assembly 408 is between approximately 60 degrees to approximately 90 degrees. Steering assembly 408 may include handlebars 410. Steering assembly 408 may be coupled to front wheel mount 416 such that turning handlebars 410 may cause front wheel 406 to turn.

Electrically powered scooter 110A includes at least one electric motor 420, at least one motor controller 422, and at least one battery 424. Motor controller 422 may be operatively coupled to electric motor 420 to drive rear wheel 404 and/or front wheel 406. In the example of FIG. 4, electric motor 420 is configured to drive rear wheel 404, in some examples, electric motor 420 may be configured to drive front wheel 406. In one example, electrically powered scooter 110A includes a plurality of motors that are each configured to drive a respective wheel.

Electrically powered scooter 110A may include a braking apparatus 430. In the example of FIG. 4, braking apparatus 430 is operatively coupled to rear wheel 404 to selectively slow and/or stop rear wheel 404. In some examples, electrically powered scooter 110A includes a braking apparatus coupled to front wheel 406.

In accordance with techniques of this disclosure, computing device 116A may receive data usable by an electrically powered scooter to traverse a particular portion of a roadway. The data may be based at least in part on roadway condition data generated by a different electrically powered scooter that indicates a roadway condition for the particular portion of the roadway. Computing device 116A may cause electrically powered scooter 110A to perform, based at least in part on the data to traverse the particular portion of the roadway, at least one operation. Example operations may include generating an output, sending a message, and/or changing an operation of the electrically powered scooter. In some examples, computing device 116A may send, to a remote computing system, roadway condition data for a particular portion of the roadway, wherein the roadway condition data indicates a roadway condition for the particular portion of the roadway and is generated based at least in part on one or more sensors communicatively coupled to the computing device.

In some examples, techniques and systems of this disclosure may provide for detection and propagation of road conditions using inertial data (accelerometer, gyroscope and magnetometer data) collected by micro-mobiles coupled with their respective GPS coordinates. Road conditions may, in some examples, refer to defects of the road network such as potholes, pavement cracking, hard turns that require attention, etc. As part of techniques and systems of this disclosure, a computing device may receive the aforementioned data from the micro-mobile probes at its input and generate a micro-mobile-centric infrastructure quality map or structure data that could be represented on a map. Using historic and/or real-time data harvested by the micro-mobile probes (e.g., sensors), an information network is established that provides alerts to micro-mobiles about areas where increased attention is needed and areas to avoid. Furthermore, this invention presents an incentive mechanism according to which routes passing through areas for which small amounts of information is available are incentivized so that more micro-mobiles drive them.

In some examples, micromobility devices collect and emit information (e.g., in real-time) about the quality of their trajectory which can be stored at a remote computing system, such as a server or the cloud platform, along with relevant historic data. The remote computing system may receive this information and process it in order to generate an infrastructure quality map (or structured data representation of the map) which uses or illustrates the harvested probe trajectory data. The infrastructure quality map or structured data representation may be processed to identify locations associated with smoother (e.g., less complex or less risky) trajectories as well as areas where the pavement has degraded to a certain level of discomfort for the micromobile operator.

In some examples, a communication network may be established amongst micromobility devices as well as remote locations. The communicate network may propagate the infrastructure quality data in the form of warnings and recommendations such that micromobility operators and/or computing devices that process the data can make more informed decisions about potential routes. An external connection to this network can also be established with authorities responsible for restoring the quality of areas that have been identified as exhibiting high degradation of the quality of the pavement.

In some examples, techniques of this disclosure may provide incentives that allows for the prioritization of routes passing through areas for which existing data are not available at a sufficient granularity. Such information and techniques may also be implemented in computing devices accessed by entities responsible for measuring the effectiveness of scheduled maintenance procedures by incentivizing the operators of the micromobility devices to route through recently maintained or constructed areas.

In some examples, a computing device may determine which areas of infrastructure are high quality or lower risk to the operation of micro-mobiles and then to change or incentivize the operation of the micro-mobile to a lower risk infrastructure layout or high infrastructure quality area. A computing device may collect infrastructure and layout information that is relevant to micromobility operation. A computing device that uses that information to determine infrastructure quality and layout factors and to determine how to change or influence the state or operation of micromobility devices through an environment. A computing device may collect information related to the infrastructure quality and layout as it relates to the operation of a micromobility device could inform riders or route applications of routes to take that may be safer due to higher quality infrastructure and layout. A computing device may inform riders operating in lower quality infrastructure of areas and objects to avoid (blind corners, potholes, raised pavement) as they operate through the environment.

Figure 5:
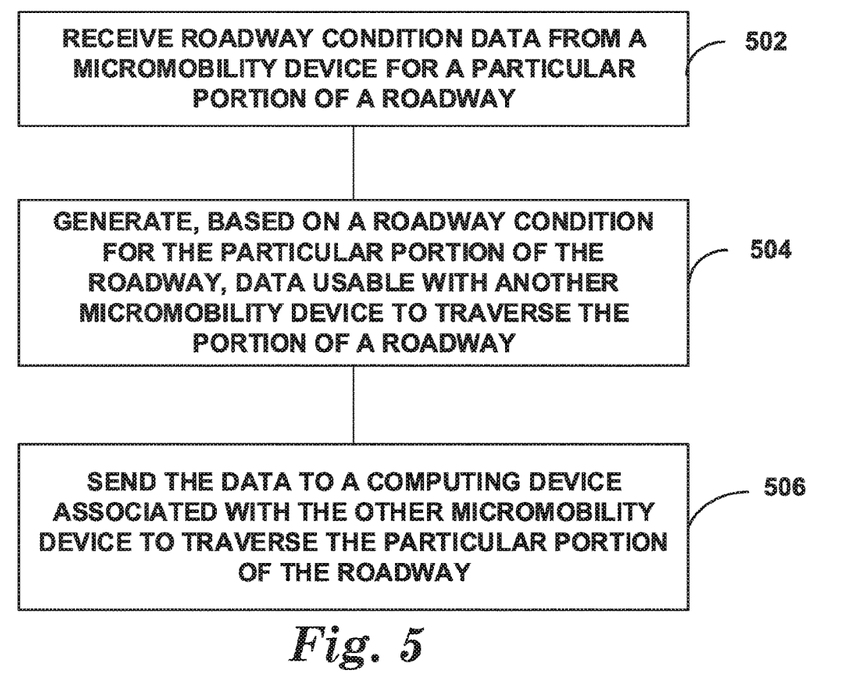
FIG. 5 is a flow diagram illustrating example operations of a computing device, in accordance with one or more techniques of this disclosure.

FIG. 5 is a flow diagram illustrating example operations of a computing device, in accordance with one or more techniques of this disclosure. The techniques are described in terms of remote computing system 150. However, the techniques may be performed by other computing devices.

In the example of FIG. 5, remote computing system 150 may receive roadway condition data from a first electrically powered scooter for a particular portion of a roadway (502). The roadway condition data may indicate a roadway condition for the particular portion of the roadway. Remote computing system 150 may generate, based at least in part on the roadway condition for the particular portion of the roadway, data usable by a computing device associated with the second electrically powered scooter to traverse the particular portion of a roadway (504). Remote computing system 150 may send the data to the computing device associated with the second electrically powered scooter to traverse the particular portion of the roadway.

Figure 6:
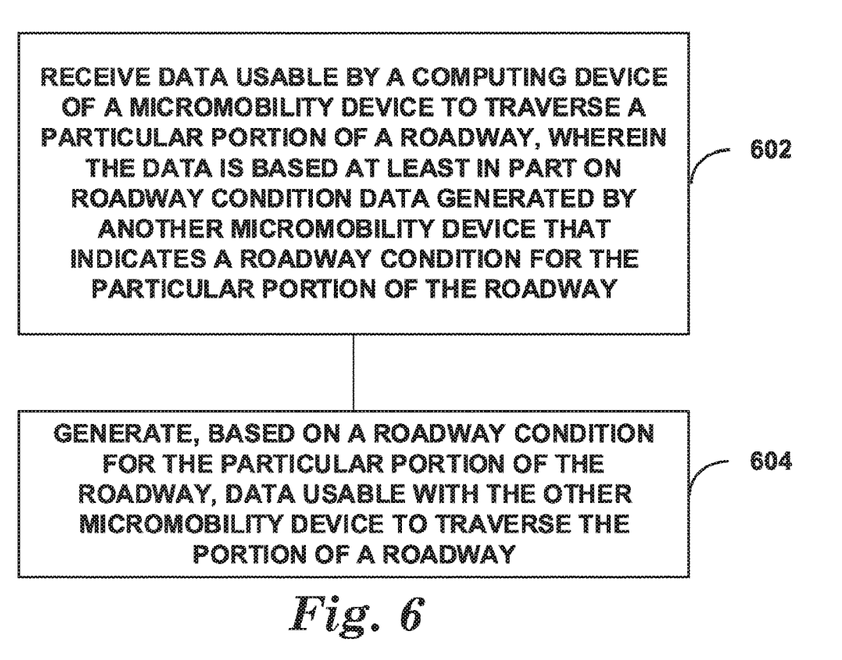
FIG. 6 is a flow diagram illustrating example operations of a computing device, in accordance with one or more techniques of this disclosure.

FIG. 6 is a flow diagram illustrating example operations of a computing device, in accordance with one or more techniques of this disclosure. The techniques are described in terms of computing device 116B. However, the techniques may be performed by other computing devices.

In the example of FIG. 6, computing device 116B may receive, via a remote computing system, data usable by the computing device to traverse a particular portion of a roadway (602). The data may be based at least in part on roadway condition data generated by a second electrically powered scooter that indicates a roadway condition for the particular portion of the roadway. Computing device 116B may perform, based at least in part on the data usable by the computing device to traverse the particular portion of the roadway, at least one operation (604). Example operations may include generating an output, sending a message, or changing an operation of a micromobility device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, eEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A computing device comprising: one or more computer processors, and a memory comprising instructions that when executed by the one or more computer processors cause the one or more computer processors to:
   receive roadway condition data from a first electrically powered scooter for a particular portion of a roadway, wherein the roadway condition data indicates a roadway condition for the particular portion of the roadway;
   generate, based at least in part on the roadway condition for the particular portion of the roadway, data usable by a computing device associated with a second electrically powered scooter to traverse the particular portion of a roadway; and
   send the data to the computing device associated with the second electrically powered scooter to traverse the particular portion of the roadway;
   wherein the computing device associated with the second electrically powered scooter, based on a receipt of the data, changes an operation of the second electrically powered scooter;
   wherein the first and second electrically powered scooters are a first type of vehicle, wherein an automobile is a second type of vehicle,
   wherein the roadway condition is applicable to the second electrically powered scooter based at least in part on a physical resolution of the roadway condition, and
   wherein the roadway condition is not applicable to the automobile based at least in part on the physical resolution of the roadway condition.

2. The computing device of claim 1, wherein the physical resolution of the roadway condition comprises at least one of a size, type, or location of the roadway condition.

3. The computing device of claim 2, wherein the physical resolution of the roadway condition comprises at least one of the size, type, or the location of the roadway condition relative to a size, speed, or operating capability of the at least one of the first or second electrically powered scooters.

4. The computing device of claim 3, wherein the operating capability comprises at least one of a suspension, braking, accelerating or turning capability of the at least one of the first or second electrically powered scooters.

5. The computing device of claim 1, wherein the one or more computer processors are configured to:
- determine a metric associated with the portion of the roadway; and
- generate, as the data, an indication of an incentive for an operator of the second electrically powered scooter for traversing at least the portion of the roadway.

6. The computing device of claim 5, wherein the metric indicates at least one of:
- a quantity of electrically powered scooters that have traversed at least the portion of the roadway;
- frequency that electrically powered scooters have traversed at least the portion of the roadway;
- no electrically powered scooters have traversed at least the portion of the roadway;
- a variability in roadway condition data indicates the roadway condition for the particular portion of the roadway; or a risk metric that indicates a risk for an electrically powered scooter that traverses at least the portion of the roadway.

7. The computing device of claim 5, wherein the one or more computer processors are configured to:
- store, for a first operator of the first electrically powered scooter, a set of incentives earned by the first operator; and
- send, as the data, information based at least in part on the set of incentives earned by the first operator to the computing device associated with the second electrically powered scooter.

8. The computing device of claim 5, wherein the one or more computer processors are configured to:
- determine a route that includes portion of the roadway; and
- generate, as the data, an indication of route for an operator of the second electrically powered scooter to traverse at least the portion of the roadway.

9. The computing device of claim 1, wherein the data usable by the computing device associated with the second electrically powered scooter to traverse the particular portion of the roadway comprises an output that informs the operator of the second electrically powered scooter of the road condition.

10. The computing device of claim 1, wherein the one or more computer processors are configured to:
- determine, based at least in part on the roadway condition data, whether the particular portion of the roadway satisfies one or more specifications or regulation.

11. A computing device, configured for a first electrically powered scooter, comprising:
- one or more computer processors, and
- a memory comprising instructions that when executed by the one or more computer processors cause the one or more computer processors to:
  - receive, via a remote computing system, data usable by the computing device to traverse a particular portion of a roadway, wherein the data are based at least in part on roadway condition data generated by a second electrically powered scooter that indicates a roadway condition for the particular portion of the roadway; and
  - perform, based at least in part on the data usable by the computing device to traverse the particular portion of the roadway, at least one operation which changes an operation of the first electrically powered scooter;
- wherein the first and second electrically powered scooters are a first type of vehicle, wherein an automobile is a second type of vehicle,
- wherein the roadway condition is applicable to the second electrically powered scooter based at least in part on a physical resolution of the roadway condition, and
- wherein the roadway condition is not applicable to the automobile based at least in part on the physical resolution of the roadway condition.

12. The computing device of claim 11, the memory comprises instructions that when executed caused the one or more computer process to:
- send, to the remote computing system, second roadway condition data for the particular portion of the roadway, wherein the second roadway condition data indicates a second roadway condition for the particular portion of the roadway and is generated based at least in part on one or more sensors communicatively coupled to the computing device.

13. The computing device of claim 11, wherein the memory comprises instructions that when executed cause the one or more computer processors to:
- receive an indication of an incentive for an operator of the first electrically powered scooter for traversing at least one portion of a roadway.

14. The computing device of claim 13, wherein the incentive for the operator of the first_electrically powered scooter for traversing at least the portion of the roadway comprises an incentive to reduce the cost of operation of an electrically powered scooter.

15. The computing device of claim 11, wherein the memory comprises instructions that when executed caused the one or more computer processors to:
- receive information based at least in part on a set of incentives earned by an operator of another electrically powered scooter.

16. The computing device of claim 11, wherein the memory comprises instructions that when executed caused the one or more computer process to:
- generate, based at least in part on the data usable by the computing device to traverse the particular portion of a roadway, an output that informs the operator of the first electrically powered scooter of the road condition.

* * * * *

UNITED STATES PATENT AND TRADEMARK OFFICE
CERTIFICATE OF CORRECTION

PATENT NO.       : 12,205,465 B2
APPLICATION NO.  : 17/610177
DATED            : January 21, 2025
INVENTOR(S)      : Jonathan Dale Gandrud et al.

Page 1 of 1

It is certified that error appears in the above-identified patent and that said Letters Patent is hereby corrected as shown below:

In the Claims

Column 22
Line 37, In Claim 14, delete "first_electrically" and insert -- first electrically --, therefor.

Signed and Sealed this
Twenty-second Day of July, 2025

Coke Morgan Stewart
*Acting Director of the United States Patent and Trademark Office*